Figure 5:
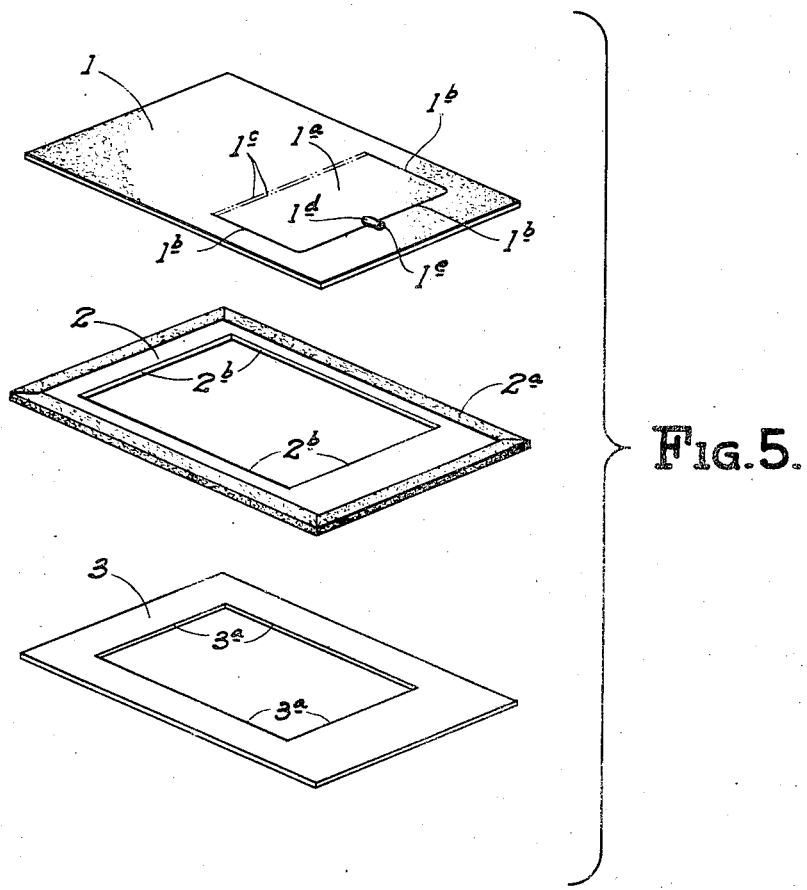

Dec. 5, 1939.    L. A. CHILCOTE    2,182,515
MOUNT FOR PHOTOGRAPHIC PRINTS OR THE LIKE
Filed Nov. 3, 1938    2 Sheets—Sheet 1
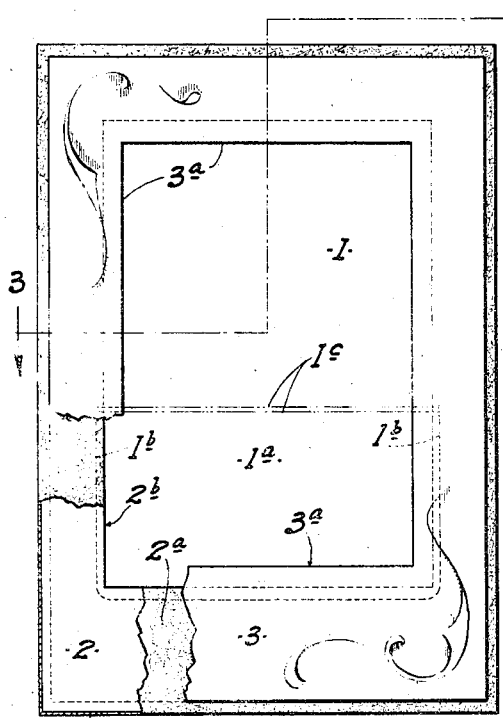
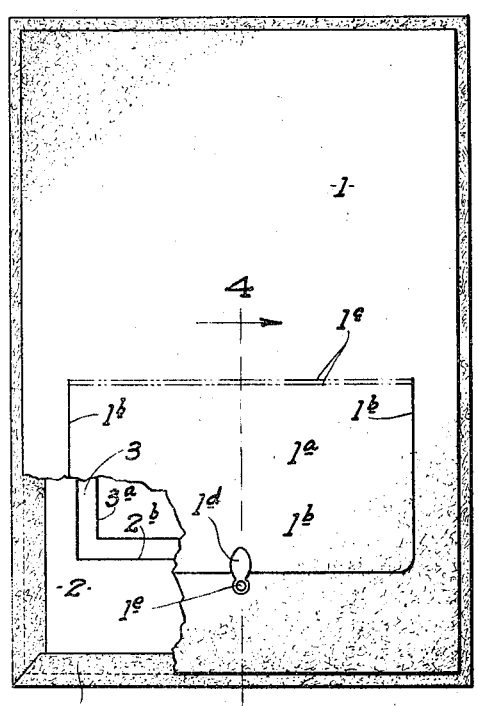
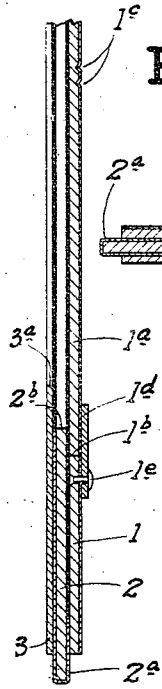
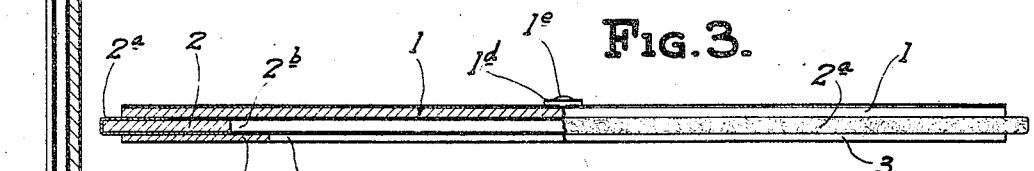
INVENTOR.
BY Lee A. Chilcote
ATTORNEYS.

Dec. 5, 1939. L. A. CHILCOTE 2,182,515
MOUNT FOR PHOTOGRAPHIC PRINTS OR THE LIKE
Filed Nov. 3, 1938   2 Sheets-Sheet 2

INVENTOR.
Lee A. Chilcote
BY Hull, Brock & West
ATTORNEYS.

Patented Dec. 5, 1939

2,182,515

UNITED STATES PATENT OFFICE 2,182,515

MOUNT FOR PHOTOGRAPHIC PRINTS OR THE LIKE

Lee A. Chilcote, Gates Mills, Ohio, assignor to The Chilcote Company, Cleveland, Ohio, a corporation of Ohio Application November 3, 1938, Serial No. 238,634

5 Claims. (Cl. 40—152)

This invention relates to an improved picture mount of the class of those furnished by photographers to their customers and wherein are mounted for display and preservation, behind a pane of glass or sheet of other transparent protective material, a photographic print or the like.

Because of this use to which articles of the above mentioned class are put, such articles must possess in no small degree the qualities of beauty and durability, and yet they must be cheap.

With these requirements in view, it is the fundamental object of my invention to provide a construction for picture mounts involving few parts, to-wit: three major units; to make each unit complete in itself and as simple and serviceable as practicable, and to fabricate the units into the finished mount according to well established methods of manufacture and with the least amount of handling.

More general objects of the invention are the attainment of beauty, durability, sturdiness of structure, convenience of use, and low cost of production in articles of the class referred to.

The foregoing objects and advantages are attained in the embodiment of the invention illustrated in the accompanying drawings that form a part hereof and wherein Fig. 1 is a front elevation, and Fig. 2 a rear elevation, of my improved picture mount; Figs. 3 and 4 are sections on the lines 3—3 and 4—4 of Figs. 1 and 2, respectively, and Fig. 5 is a perspective view of the three major units of which the mount is composed, showing them separated but arranged in the order in which they are assembled.

The three major units comprising my improved picture mount are a back board 1, a spacing member 2 and a front frame 3. The back board 1 consists of a piece of relatively stiff material, desirably multiple ply cardboard, and it is preferably die cut from stock that is faced on one side—the side forming the exposed rear side of the back board when the parts are made and assembled—with a suitable surface coating, for example, a superficial layer of thin sheet material, such as paper having a decorative or ornamental surface.

At the same time the back board is cut, it may be formed with a picture inserting opening that is normally closed by a rectangular closure designated 1a, such closure desirably being severed from the surrounding portion of the back board along three sides, the line of cleavage being designated 1b; and along its fourth side the closure 1a is integrally connected to the body of the back board by a hinge-like portion effected by scores 1c. A button 1d is pivotally connected by rivet 1e to the back board adjacent the edge of the closure remote from the scores 1c for engagement over said edge.

The spacing member 2 consists of a rectangular piece of suitable material that is somewhat wider and longer than the back board so that when the back board is applied to the spacing member in a manner hereinafter to be described, the marginal portion of the spacing member will extent a material distance beyond the periphery of the back board. For reasons that will presently appear, it is important that the spacing member be quite sturdy, and that its edge portion be very durable. To this end the spacing member may be made of a tough heavily pressed fiber board or the like, or it may be treated, especially its edge portion, in a manner to increase its toughness and durability throughout this region. However, for the sake of economy, I prefer to make the spacing member of multiple ply or laminated cardboard of proper thickness, and to bind the edge portion thereof with a durable covering material so as to thoroughly protect such edge. Furthermore, the appearance of the mount may be enhanced by utilizing for this purpose a covering material of an ornamental or decorative nature.

According to the present embodiment, a binding element 2a is wrapped about the edge of the spacing member 2 and extends inwardly across the obverse and reverse sides of the member a substantial distance, in any event, far enough to underlie the edges of the backboard and front frame when they are applied to the respective reverse and obverse sides of the spacing member substantially centrally thereof. The binding element 2a may consist of a tough durable paper, or cloth, or a combination of the two, and its outer surface is desirably of a decorative or ornamental character. Or said element may consist of imitation leather, light sheet metal or metal foil, passe partout tape or the like. The binding element is suitably secured, as by gluing, to the spacing member.

The spacing member is provided with a picture well 2b for the reception of the photographic print or other display and a pane of glass or sheet of other transparent protective material (not shown). In this connection, it may be explained that the over-all thickness of the spacing member or unit 2 should be not less than the aggregate thickness of the print or display and the pane or sheet of protective material.

The front frame 3 is desirably of about the same length and width as the back board—in any event, less in these dimensions than the spacing member—so that when the front board is applied to the spacing member, approximately centrally thereof, a substantial margin of the spacing member will show entirely about the front frame. The front frame may be die cut or otherwise produced from cardboard or the like having an ornamental or decorative front surface, embellished, if desired, by printing, embossing or otherwise affixing thereto an artistic design. The front frame has a sight opening 3ª which is substantially central of the frame, excepting for the fact that the marginal portion of the frame below the opening may be somewhat wider than that above and along the sides, in accordance with the traditional proportions of picture mats. The picture well 2ᵇ of the spacing member 2 is similarly situated with respect to the marginal portions of the latter unit, and when the parts are assembled the sight opening 3ª is substantially in axial alignment with the picture well.

Prior to assembling the mount, each of the major units 1, 2 and 3 is made complete; the back board simply by die cutting it from stock having a superficial layer of surfacing material on one side, and riveting to the back board the button 1ᵈ; by cutting or die stamping the spacing member 2 from suitable stock and applying to its edge portion the protective coating or binding element 2ª, such element being tightly engaged about the edge portion of the unit and secured thereto by a suitable adhesive or other means; and by cutting or die stamping the front frame 3 from suitable material and printing or otherwise applying to its front face, if desired, the design aforesaid. All that remains to complete the picture mount is to glue these units together, and this is preferably done in substantially the same way that ply board is laminated under pressure, an efficient glue or other effective adhesive being used to insure permanent connection of the parts.

After assembly, and following the usual custom in the completion of such articles, an easel strut, or a suspending ring or the like, or both, may be suitably fastened to the back board 1, these parts being omitted from the drawings for the sake of clearness.

It will be seen from the foregoing that my invention provides an attractive and durable picture mount in which the only edge portion that is exposed to any degree of abuse in the intended use of the article is thoroughly protected by the coating or binding element 2ª. The edges of the back board and front frame are effectively protected by the extended edge portions of the spacing member wherefore these edges may be left raw, so to speak. The front frame is preferably made of a material that is substantially of the same color throughout its thickness so that the inner and outer edges of the front frame need not be treated in any way; and the edges of the back board (which in the majority of cases would be a different color from that of the rear surface of said board and the projecting marginal portion of the spacing member) may be stained to correspond in color to the adjacent parts, or said edges may be left in their natural state as they are hidden by the extended marginal portion of the spacing member from any position excepting one to the side or toward the rear of the mount.

Having thus described my invention, what I claim is:

1. A picture mount comprising a spacing member having a protective element applied to its marginal portion, a separate back board and a separate front frame that are shorter and narrower than the spacing member applied, respectively, to the rear side and front side of the spacing member with their edges spaced inwardly from the corresponding edges of the spacing member, the parts being secured together in the foregoing relation by suitable means, the spacing member having a picture well, and the front frame a sight opening smaller than said well and in substantially axial alignment therewith.

2. A picture mount comprising a spacing member, a binding element encasing the marginal portion of said member and extending inwardly along the front and rear sides of said member a material distance, a front frame and a back board that are shorter and narrower than the spacing member secured, respectively, to the front and rear surfaces of said member with their edges spaced inwardly a substantial distance from the periphery of the spacing member but so as to conceal the inner edges of the binding element, the spacing member having a picture well, and the front frame a sight opening smaller than said well and in substantially axial alignment therewith.

3. A picture mount comprising a rectangular spacing member, a protective element encasing the marginal portions of the spacing member, a rectangular front frame and a rectangular back board that are shorter and narrower than the spacing member secured to the front and rear sides, respectively, of the spacing member with all edges of each spaced inwardly a like distance from the corresponding edges of the spacing member, the spacing member having a picture well and the front frame a sight opening smaller than said well and in substantially axial alignment therewith.

4. A picture mount comprising a spacing member, a binding element encasing the margin of the spacing member and extending inwardly over the front and rear surfaces of said member a substantial distance, a back board applied to the rear side of the spacing member with its edges spaced inwardly from the corresponding edges of the spacing member and overlying the adjacent edge portions of the binding element, the material of which the back board is constructed incorporating a superficial layer of coating material constituting the rear face of the back board, and a pre-decorated front frame that is shorter and narrower than the spacing member applied to the front side of said member with its edges spaced inwardly from the corresponding edges of the spacing member and overlying the adjacent edge portions of the binding element, the spacing member having a picture well, and the front frame a sight opening that is smaller than said well and is in substantially axial alignment therewith.

5. A picture mount comprising a back board, a front frame, and a spacing member constructed independently of, and interposed between, the back board and front frame and whose peripheral portion is constituted of material that is highly wear resistant and projects beyond the edges of the back board and front frame, the foregoing elements being secured together by suitable means, said spacing member having a picture well, and the front frame a sight opening smaller than said well and in substantially axial alignment therewith.

LEE A. CHILCOTE.